United States Patent

Chuah et al.

Patent Number: 5,515,534
Date of Patent: May 7, 1996

[54] METHOD OF TRANSLATING FREE-FORMAT DATA RECORDS INTO A NORMALIZED FORMAT BASED ON WEIGHTED ATTRIBUTE VARIANTS

[75] Inventors: Mooi C. Chuah, Middletown; Wing S. Wong, Holmdel, both of N.J.

[73] Assignee: AT&T Corp., Murray Hill, N.J.

[21] Appl. No.: 953,403

[22] Filed: Sep. 29, 1992

[51] Int. Cl.⁶ .................................................. G06F 17/30
[52] U.S. Cl. ................................. 395/600; 364/DIG. 1; 364/282.1
[58] Field of Search ............................. 395/600; 364/419

[56] References Cited

U.S. PATENT DOCUMENTS

| | | | |
|---|---|---|---|
| 4,974,191 | 11/1990 | Amirghodsi et al. | 395/275 |
| 5,227,971 | 7/1993 | Nakajima et al. | 364/419.02 |
| 5,265,065 | 11/1993 | Turtle | 395/600 |
| 5,268,839 | 12/1993 | Kaji | 364/419.03 |
| 5,276,616 | 1/1994 | Kuga et al. | 364/419.08 |
| 5,333,317 | 7/1994 | Dann | 395/600 |
| 5,428,777 | 6/1995 | Perliski et al. | 395/600 |
| 5,434,974 | 7/1995 | Loucks et al. | 395/700 |

*Primary Examiner*—Wayne Amsbury
*Attorney, Agent, or Firm*—Frederick B. Luludis

[57] ABSTRACT

A facility is provided for normalizing the format of stored data records using a dictionary that is generated from a training set of data records having predefined formats.

7 Claims, 6 Drawing Sheets

| f 1  | APARTMENT NO.       |
|------|---------------------|
| f 2  | STREET NO.          |
| f 3  | STREET NAME         |
| f 4  | CITY                |
| f 5  | STATE               |
| f 6  | ZIP CODE            |
| f 7  | BUILDING NO.        |
| f 8  | BUILDING NAME       |
| f 9  | BUILDING ORIENTATION |
| f 10 | STREET ORIENTATION  |

FIG. 3

| | |
|---|---|
| APT. 28 | (f1,1) |
| APT. % % | (f1,11) |
| % % % | (f2,1) |
| % % % % | (f2,1) |
| TABLER STATION RD. | (f3,1) |
| **RD. | (f3,16) |
| TABLER** | (f3,1) |
| *STATION* | (f3,1) |
| MARTINSBURG | (f4,1) |
| WV | (f5,11) |
| % % % % % | (f6,101) |

| | |
|---|---|
| % % % | (f1,20) |
| *ST | (f2,5) |
| WASHINGTON | (f3,3) (f4,45) |
| DC | (f5,10) |
| SE | (f10,10) |
| %%%%-%%% | (f6,18) |
| ST* | (f3,1) |

FIG. 7

| TOKEN | OUTPUT |
|---|---|
| 499 | (f1,0.99) |
| CAPITOL ST. | (f2,0.58) |
| WASHINGTON | (f3,0.34) (f4,0.68) |
| DC | (f5,0.15) |
| SE | (f10,0.78) |
| 20003-4013 | (f6,0.99) |
| ST SE | (f3,0.15) |
| – | – |
| – | – |
| – | – |
| – | – |

METHOD OF TRANSLATING FREE-FORMAT DATA RECORDS INTO A NORMALIZED FORMAT BASED ON WEIGHTED ATTRIBUTE VARIANTS

FIELD OF THE INVENTION

The invention relates to expert systems and, more particularly, relates to an expert system which normalizes the format of information, such as an address, stored in a database.

BACKGROUND OF THE INVENTION

It is often the case that different databases may contain essentially the same information. For example, particular information may be stored in each database as a record comprising a plurality of fields with each field containing a particular attribute of the associated information, such as, for example, a mailing address. Moreover, the attributes of an information record may be stored in one form in one database and in a different form in another database. For example, the street address of 32 South Street may be stored in one database as 32 So St., and stored in another database as 32 S. Street To deal with such differences, those responsible for the management of such databases periodically match corresponding attributes of related records stored in respective databases to identify and reconcile any differences that might be encountered. It can be appreciated that reconciling the contents of the databases is expensive, since it is labor intensive.

SUMMARY OF THE INVENTION

We have recognized that a better approach to normalizing stored data may be realized by taking advantage of the dynamics of neural networks which have the capability to "learn" and which are easy to update. More particularly, in accord with the invention, our normalization process is first trained using a number of records having predefined attributes, in which such training results in generating an initial dictionary composed of various attributes of the predefined records and associated scores indicative of the number of times that a particular attribute was encountered during the training process. A particular record that is to be normalized is then partitioned into respective segments based on predetermined partitioning rules, in which a segment may be formed from one or more components forming the particular database record. The library is then used to identify various interpretations of a segment such that the interpretation having the highest score is selected as the meaning for that segment. The particular record is then normalized as a function of the selected interpretation.

DETAILED DESCRIPTION

To facilitate an understanding of the ensuing detailed description, it would be best to first discuss a number of different definitions and basic assumptions. Specifically, an address stored in a database is considered to be formed from a number of different attributes, namely, building-level, street-level and city-level attributes, in which each attribute may be divided into sub-attributes or fields. For example, a building-level attribute may contain apartment number, building number and building name fields as well as a building orientation field (i.e., east, west, north and south). Similarly, the street-level attribute may contain street number, sweet name and street orientation fields; and the city-level attribute may contain city, state and zip code fields. It is assumed that each field may contain a variable number of words that are separated from one another by a space (blank). The set of such fields forming an address is denoted by F={f1, f2, ..., f10}.

In addition, an address record, A, is assumed to be formed from a sequence of alphanumeric words, $(w_1, w_2, \ldots, w_m)$, and an n-token of A is an ordered n-tuple of the form: $T=(w_{i_1}, w_{i_2}, \ldots, w_{i_n})$, where $i_j \neq i_k$. Moreover, if a token has the property that $i_j < i_k$ for all values of $i_j$, then the token is said to be order-preserving and a partition, P, of an address record then partitions all of the words forming the record into non-overlapping tokens of various lengths. An interpretation, I, of such a partition may then be determined using the associated dictionary.

The address dictionary is formed from a number of entries, in which each entry contains a token and an associated weight vector $v_i$. The value of $v_i$ is a function of the number of times that the associated token is associated with a particular attribute, $f_i$. More particularly, the value of a weight vector, $v_i$, is based on a weighting function of the following form:

$$v_i = \frac{w}{1 + e^{k*cnt}} \qquad (1)$$

where equation (1) is a so-called Sigmoid function and where cnt is the number of times that the associated token is encountered during the generation of the dictionary, as will be explained below; and where parameters w and k are scaling factors that are set according to the number of words forming the associated token, as will also be explained below.

It can be appreciated that a large number of tokens having different word lengths and permutations may be generated for a particular address record. As such, the normalization of an address record would consume an inordinate amount of processing time. To deal with that problem we consider tokens having a relatively small number of words, for example, four words, and only consider order-preserving tokens.

With the foregoing in mind, we now discuss an illustrative embodiment of the invention which may include (a) an initial training process, (b) a level 1 learning process and (c)

a level 2 learning process. The initial training process generates the aforementioned dictionary based on a predetermined set of address records, each having a predefined format. The level 1 learning process updates the aforementioned dictionary so that it reflects the values of the weight vectors, $v_i$, of the tokens forming a current interpretation of an address being normalized. The level 2 learning process adjusts ("tunes") the values of the w and k parameters contained in equation 1.

During the initial training process, a plurality (set) of addresses are supplied, one at a time, to a trainer program (discussed below) running on a computer, such as computer, or workstation, 200 shown in FIG. 1. The training set may be supplied from either an external or internal source of such addresses. It is assumed herein that memory 210, which may be, for example, a disc memory, is the source of the training set of addresses each having a predefined format, as mentioned above. Accordingly, the trainer may easily partition a training address into a predefined set of respective tokens. As will be shown below, a token may fit into one or more of the aforementioned fields, f1 through f10, in which the order of those fields correspond with the aforementioned predefined format. An illustrative definition of the latter fields is shown in FIG. 2.

More particularly, when the trainer program running on computer 200 is presented with a training address, the training program partitions the address into a plurality of order-preserving tokens, in which each such partition is performed in accord with the predefined format of the address. The trainer program then searches the dictionary for entries which match corresponding ones of the partitioned tokens. When such a match is found, the training program increments a counter associated with the corresponding field f1 through f10. For example, assume that the token is the word "Washington" that is positioned in a training address as a street name associated with field f3. Also assume that the dictionary contains that name as a state name associated with field f5. The training program will thus find a match between the token "Washington" and an entry in the dictionary, but will not find a match between that token and an entry associated with field f3. Accordingly, the trainer program enters the identity of field f3 and a count of 1 (f3,1) to the Washington entry that is already contained in the dictionary. An illustrative example of that entry would be as follows: Washington:(f5,21)(f3,1), which assumes that thus far in the training process the word Washington had been encountered twenty-one times as a state name and, as just noted, a single time as a street name.

As an aspect of the invention, the trainer program also generates what we call free-matching tokens to allow partial matching between a token of an unformatted address and an entry in the dictionary. In an illustrative embodiment of the invention, the star sign (*) is used to specify a free-matching word and the percent sign (%) is used to specify a free-matching number, as will be shown below. For example, consider the following training address:

Apt 28, 3300, Tabler Station Rd, Martinsburg, WV, 25401 which employs commas (,) to delimit the contents of fields f1 through f6 from one another. It is noted that since the training address does not contain entries for fields f7 through f10 and since all of the preceding fields contain entries, then the commas associated with fields f7 through f10 may be omitted from the training address. The trainer program, responsive to receiving the above address from memory 210, partitions the address into respective tokens based on the positions of the associated commas contained therein. Thus, as mentioned above, the program partitions the address into a number of actual tokens and a number of free-matching tokens and then searches the dictionary for respective matches thereof. The following is an illustrative example of the way in which the trainer program partitions the above address into tokens:

Apt 28 (apartment No.);

Apt%% (apartment No.);

3300 (street No.);

%%%% (street No.);

Tabler Station Rd (street name);

Tabler** (street name);

*Station* (street name);

**Rd (street name);

Martinsburg (city);

WV (state);

%%%%% (Zip code)

Figure 3:
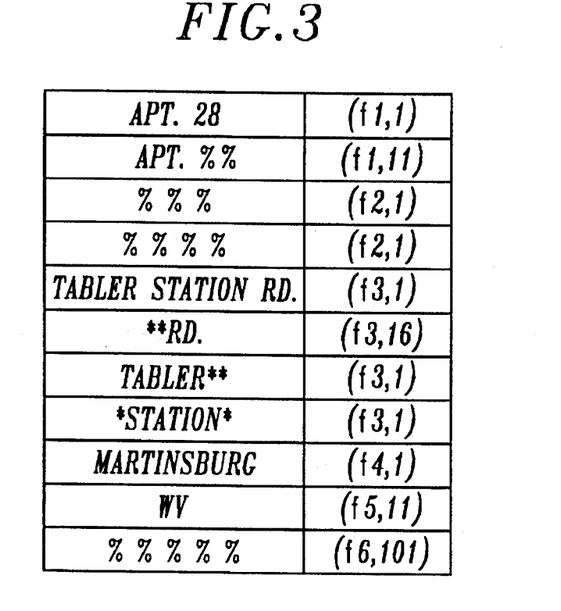
FIG. 3 is an illustrative example of an attribute dictionary that may be stored in memory associated with the processor of FIG. 1.

It is seen from the foregoing that the trainer program generates three free-matching tokens from the street name of "Tabler Station Rd". Such free-matching tokens are useful during the normalization process, since they provide the invention with a means of associating tokens generated from other addresses, such as, "Tabler Wind avenue", "Bollis State Rd", "Round Station Lane", etc., with the street name field, f2. An illustrative example of some of the relevant entries that are made in the dictionary as a result of processing the above address is shown in FIG. 3, which assumes particular counts for a number of the entries. For example, FIG. 3 assumes that the token WV has been encountered eleven times thus far in the training process. (It is noted that for the sake of brevity the street number 3300 and zip code 25401 are not shown in FIG. 3. However, they are represented in the FIG. by free matching tokens %%%% and %%%%%, respectively.)

Figure 1:
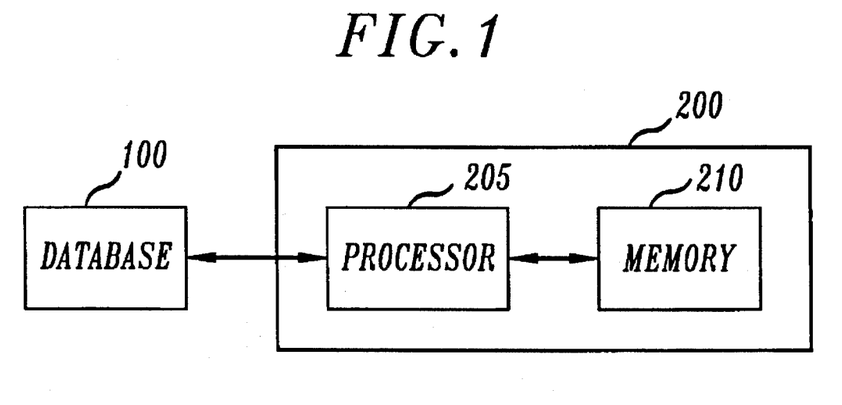
FIG. 1 is a simple block diagram of a system in which the principles of the invention may be practiced.
Figure 2:
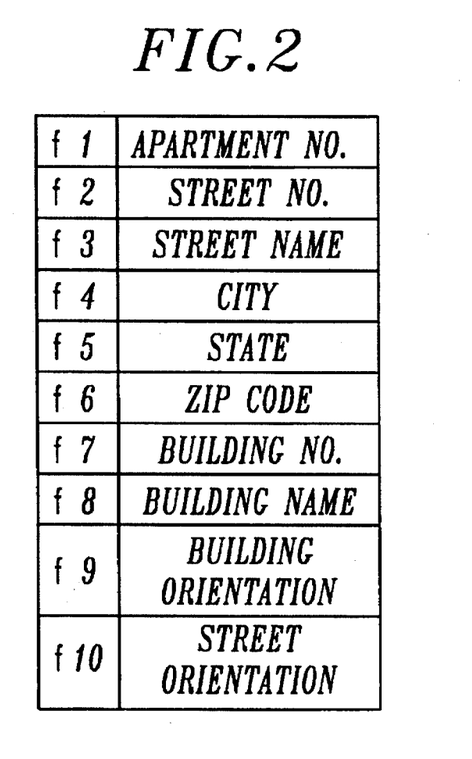
FIG. 2 illustrates an example of the attributes forming a particular data record.

Following the training session, the system is poised to normalize free-formatted addresses that are stored in a memory, such as database 100 (FIG. 1).

Figure 4:
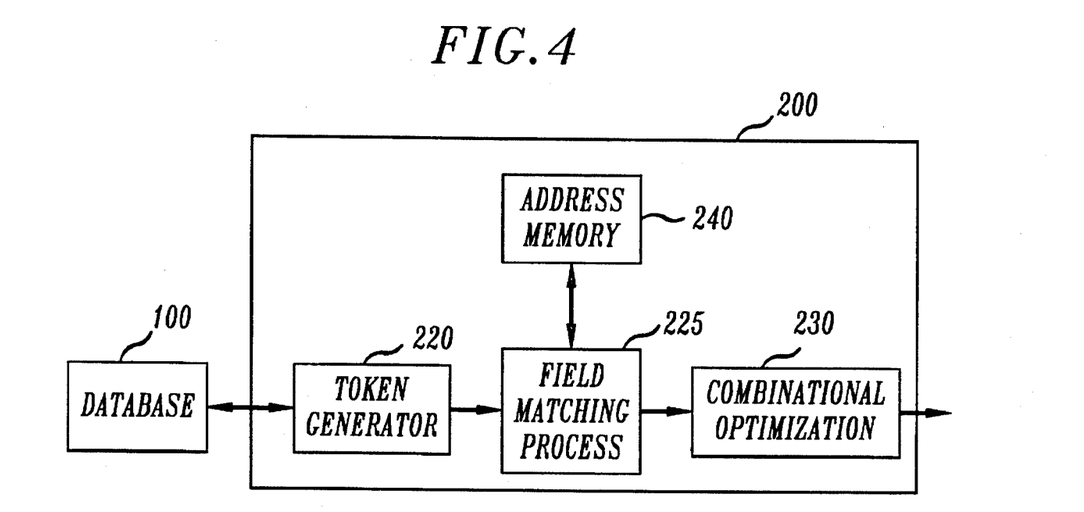
FIG. 4 is a logical layout of the program which implements the invention in the processor of FIG. 1.

In particular, once the training program has completed its function, it invokes the program which normalizes an address that is unloaded from database 100. A block diagram showing the logical layout of the normalization program that is stored in memory internal to processor 205 and which directs the operation thereof is shown in FIG. 4. It is seen from the FIG. that the normalization program is composed of three sections. Token generator 220, in particular, unloads, or accepts, an address from database 100 and then partitions the address into respective sets of n-ordered word tuples (tokens) and passes the results to field matching process 225 which compares each such token with entries forming the dictionary contained in memory 240 and which passes the results to process 230, as will be explained below. Such n-ordered tuples include a set of one-word tokens, a set of two-word tokens, a set of three-word tokens, and so on. In the present illustrative embodiment of the invention, n equals four, as mentioned above.

Figure 5:
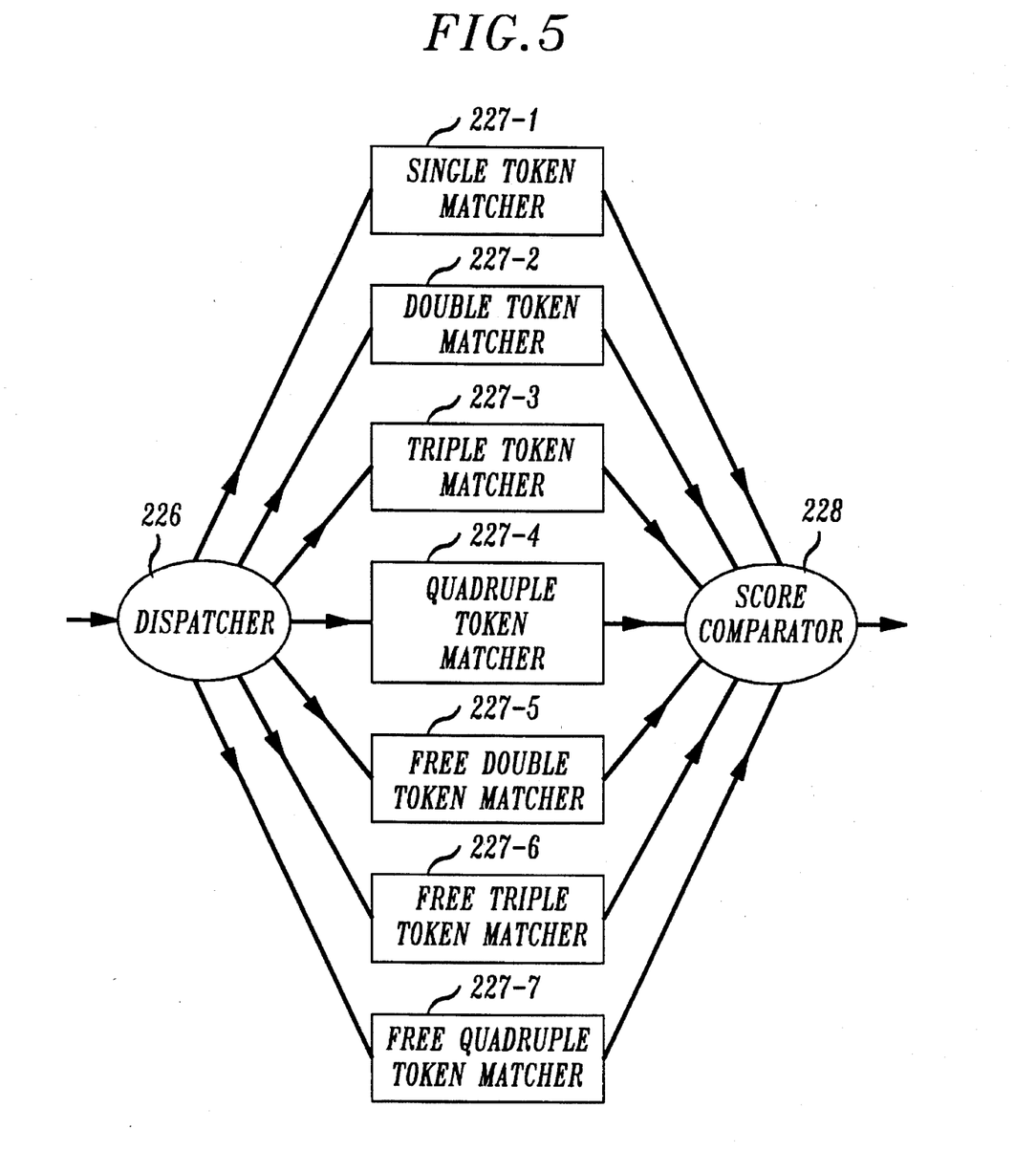
FIG. 5 is a detailed logical layout of the field matching process of FIG. 4.

An expanded version of field matching process 225 is shown in FIG. 5. In particular, dispatcher 226 operates to accept a token from generator 220 and pass the token to a particular one of the matchers 227-1 through 227-7. That is, one-word tokens are passed to matcher 227-1, two-word tokens are passed to marcher 227-2, and so on. Similarly, free-matching tokens are also passed to matchers 227-5 through 227-7, respectively. When a marcher receives a token, it searches dictionary 240 to see if the token that it receives matches an attribute stored in dictionary 240. For each such match, the marcher, e.g., marcher 227-1, generates (calculates) a score for the matched token using equation one (1) and the count associated with the matched attribute as well as the values of associated parameters $k_i$ and $w_i$. The matcher then passes the matched token and associated score to score comparator 228.

For a given address, score comparator 228 tracks the score determined for each token that it receives to identify for each attribute field the two tokens having the highest scores. Comparator 228 then passes such tokens to combinational optimization process 230 (FIG. 4). Optimization process 230 then normalizes the address based on the tokens and respective scores that it receives from comparator 228, as will be discussed below in detail.

For example, assume that token generator 220 unloads a free formatted address of "499 Capitol St SE, Washington, D.C. 20003-4013" from database 100, partitions the unloaded address into respective sets of specific matching tokens (ordered n-word tuples, where n=4) and then supplies the sets to matchers 227-1 through 227-4, respectively. The following is an illustrative example of such partitions, which are generated in the manner discussed above and which, for the sake of brevity, do not include all possible partitions or combination of the words forming the above address:

1- {499, Capitol, St, SE, Washington, DC,20003-4013},;

2- {499 Capitol, Capitol St, St SE, SE Washington, Washington D.C., D.C. 20003-4013};

3- {499 Capitol St, Capitol St SE, St SE Washington, SE Washington D.C., Washington D.C. 20003-4013};

4- {499 Capitol St SE; Capitol St SE Washington; St SE Washington D.C., SE Washington D.C. 20003-4013}.

Generator 220 also generates respective sets of free-matching tokens to allow partial matching of an address token and a token contained in the dictionary. Generator 220 then supplies those sets to matchers 227-5 through 227-7, respectively. The following is an example of such partitions:

5- {*St, St*,*Washington, . . . }

6- {*St*, St,Washington, . . . }

Figure 6:
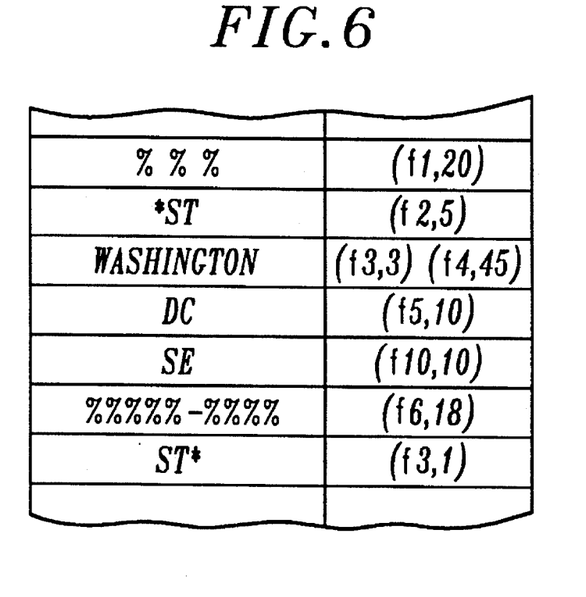
FIG. 6 illustrates a small portion of an exemplary dictionary that is generated by the processes of FIG. 4.

7- {Capitol***, . . . },

Also assume that (a) FIG. 6 represents a small portion of dictionary 240 that is relevant to the instant example, and (b) the word Capitol is not contained in the dictionary. Of the single word tokens forming set 1, matcher 227-1 finds that only 499, Washington, D.C., SE and 20003-4013 match corresponding attributes in the dictionary and, therefore, generates respective score values, $v_i$, for those tokens using equation one (1) and the associated attribute counts. For example, matcher 227-1 finds that the single word token "DC" matches a state attribute (f5) and therefore generates an associated score of 0.15 using the count of 10 and respective $k_1$ and $w_1$ values. Moreover, matcher 227-1 finds that the token "Washington" is contained in the dictionary as a street name attribute (f2) as a result of the free matching attribute SE and as a city name attribute (f4) and, therefore, generates respective scores of 0.58 and 0.99. For the sake of brevity and not by way of limitation, it is assumed that matchers 227-2 through 227-4 do not find a match between the tokens forming their respective sets of tokens and entries in the dictionary. However, matcher 227-5 would find a match between the token "Capitol St" of the set of tokens that it is processing and the street name (f3) attribute of "*St" that is contained in the dictionary. Accordingly, matcher 227-5 generates a score for that match using equation (1), the associated f3 count and associated $k_5$ and $w_5$ parameter values. Matcher 227-5 then passes the matched token and its associated score to score comparator 228.

(Also, for the sake of brevity and not by way of limitation, it is further assumed that matchers 227-6 and 227-7 do not find matches between the tokens forming their respective sets of tokens and entries in the dictionary.)

Figure 7:
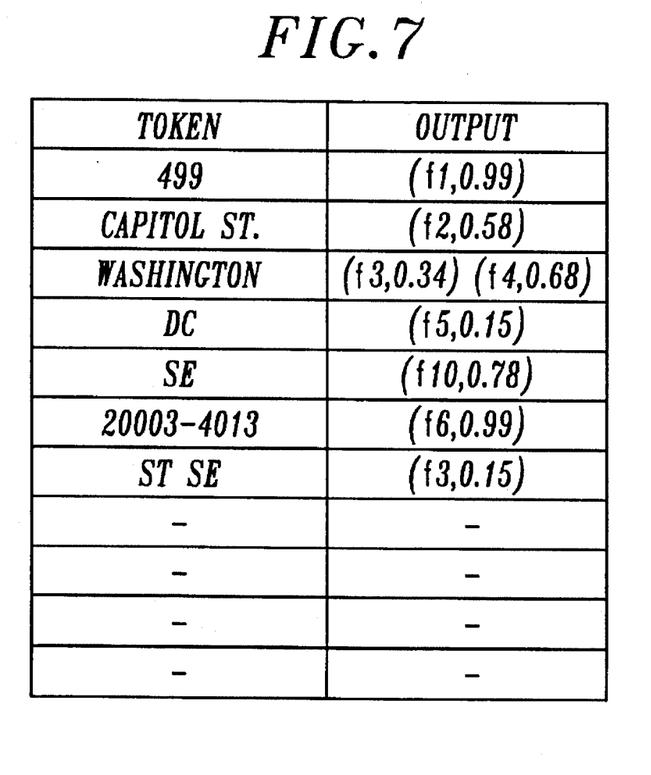
FIG. 7 is an illustrative example of the results obtained by the matching process of FIG. 4 when processing a particular data record and using the dictionary of FIG. 6.

FIG. 7 is an illustrative example of some of the results of the matching process that are supplied to score comparator 228. As mentioned above, score comparator 228, in turn, tracks the score determined for each matched token to identify for each attribute field and for the current address the two tokens having the highest scores. Hopefully, then, when matchers 227-1 through 227-7 have completed the processing of their respective sets of tokens, comparator 228 will have identified for each attribute field the two tokens having the highest scores. In practice, there is a chance that just one such token, or none, is so identified.

In particular, score comparator 228 maintains two storage registers (e.g., memory locations) for each attribute field defined above. When comparator 228 receives the output from one of the matchers 227-1 through 227-7, comparator 228 first identifies the two registers that are associated with the field identified in such output. If each of those registers contain a token and an associated score, then comparator 228 compares the received score with the score contained in each of the two identified registers. If the received score is found to be larger than one of the scores contained in one of those registers, or one of the registers is empty, then comparator 228 overwrites the contents of that register using the received output. If that is not the case, then comparator 228 discards the received output.

When the processing of all of the sets of tokens derived (generated) for the current address has been completed, then process 230 interprets all combinations of the tokens stored in the aforementioned registers. In doing so, process 230 sums the scores associated with the tokens forming a particular interpretation and deducts therefrom a predetermined value, for example, a value of 0.25, for each token not used in the interpretation. Process 230 then outputs as the normalized address the interpretation having the largest sum. For example, the following interpretation has a score of 2.73.

Street No. =499

Street Name=Washington

Street Orientation=SE

State=D.C.

Zipcode=20003-40 13 unused words=Capitol and St.

Process 230 will find, however, that the following interpretation has a score 4.17, which is the highest total score of all possible interpretations. Accordingly, process 230 outputs the following as the normalized address:

Street No. =499

Street Name=Capitol St.

Street Orientation=Se

City=Washington

State=D.C.

Zipcode=20003-4013

As mentioned above, the $k_i$ and $w_i$ parameter values are adjusted during the level 2 learning process, in which such values could be established for each attribute or two such values could serve all matching functions. For the sake of accuracy, however, we customize the parameter values for each matcher 227-1 through 227-7.

Specifically, the various parameter values $k_i$ and $w_i$ are derived using a set of valid, normalized address records that are selected as a training set. The parameter training process initially uses particular default values, for example, the values of 0.3 and 0.5 for $k_i$ and $w_i$, respectively. The parameter training process also uses a variable Err i to track the number of errors made by each of the matchers 227-1 through 227-7 during the processing of the training set of normalized addresses. When the training set of addresses have been processed in the manner discussed above, the system then adjusts the $k_i$ and $w_i$ values associated with the matcher, e.g., matcher 227-1, having the highest value of $Err_i$. That is, the system adjusts those values in a particular direction, e.g., increases them by a predetermined step size. The system then repeats the normalization process using the same set of valid training addresses, and adjusts the $k_i$ and $w_i$ values associated with the marcher experiencing the highest number of errors during that run. If that matcher happens to be the matcher that had highest number of errors at the end of the previous processing of the training set, i.e., marcher 227-1, then its $k_i$ and $w_i$ values are adjusted in the opposite direction, i.e., decreased by a predetermined step size. Moreover, the system continues to adjust the $k_i$ and $w_i$ values associated with that matcher until the score of the selected interpretation reaches a steady state value. The system then repeats the above process for the values of $k_i$ and $w_i$ associated with the marcher, e.g., matcher 227-2, experiencing the next highest level of errors. The system repeats the foregoing iterations for each marcher until the error rate associated with that matcher decreases to a minimum value. At that point, the $k_i$ and $w_i$ parameters respectively associated with matchers 227-1 through 227-7 should be at their optimum values.

Figure 8:
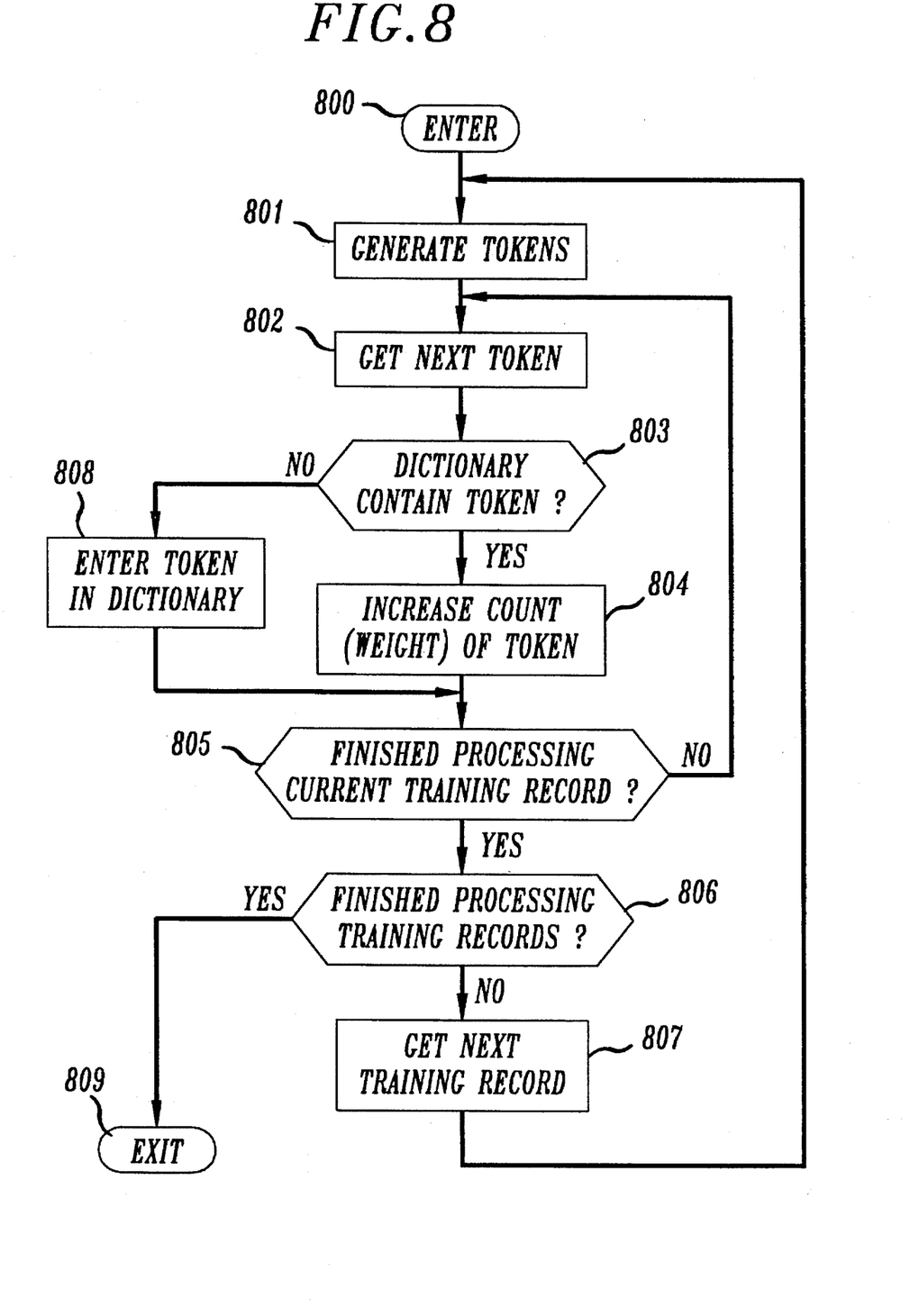
FIGS. 8 and 9 illustrate in flow chart form the program which implements the invention in the processor of FIG. 1.

Turning now to FIG. 8, there is shown in flow chart form the program which constructs the dictionary of tokens that is to be used in conjunction with normalizing data contained in records stored in a database, e.g., database 100 (FIG. 1). Specifically, the program is entered at block 800 and proceeds to block 801 upon receipt of a training data record having a predefined formal At block 801, the program partitions the received training record into tokens, in the manner discussed above. The program then passes the first of such tokens to block 803 via block 802. At block 803, the program determines if the token is already contained in the dictionary. If it is not, then the program proceeds to block 808 where it enters the token in the dictionary and then proceeds to block 805. If the token is found to be contained in the dictionary, then the program proceeds to block 804 where it increases the dictionary count associated with that token and then proceeds to block 805.

At block 805, the program determines if it has finished processing the current training record. If it has not, then the program returns to block 802 to begin the processing of the next token forming the current training record. Other wise, the program proceeds to block 806 where it determines if it has finished building the dictionary, i.e., has processed all of the training records. If that is the case, then the program exits via block 809. Other wise, the program proceeds to block 807 where it gets the next training record to be processed and then proceeds to block 801 to begin the processing of that data record.

Figure 9:
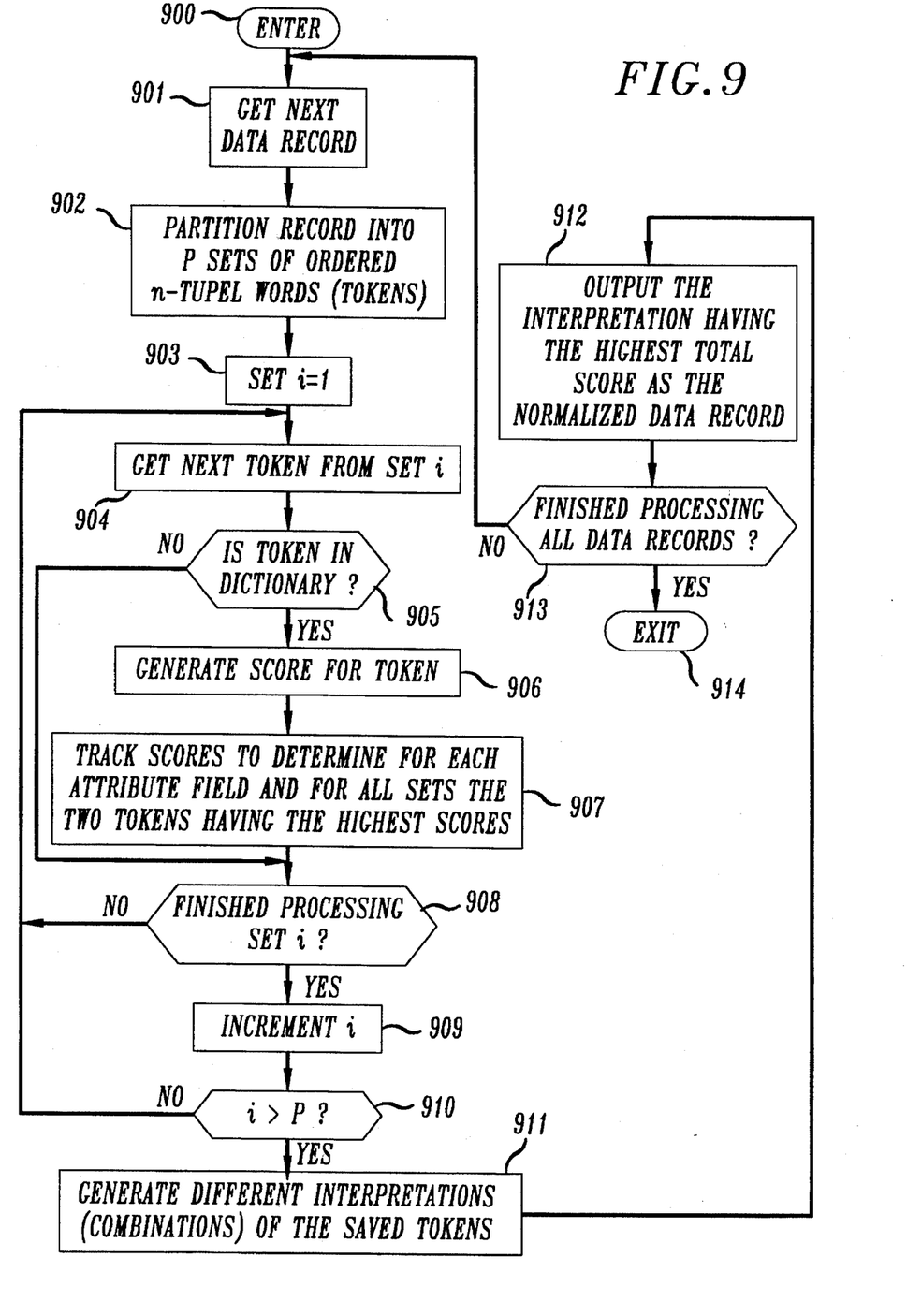

Turning now to FIG. 9, there is shown in flow chart form the program which normalizes the format of data forming records stored in a database, e.g., database 100 (FIG. 1 ). Specifically, the program is entered at block 900 and proceeds to block 902 via block 901 upon receipt of a data record. At block 902, the program partitions the data forming the record into P, e.g., seven, sets of tokens as discussed in connection with FIG. 5. The program then proceeds to block 903 where it sets a variable "T" to a value of one so that the variable points to the first set of tokens. The program then proceeds to block 904 where it starts the processing of each token forming the ith set of tokens, in which the processing involves determining if a particular token of that set is contained in the dictionary (block 905). If that is the case, then the program (block 906) generates a score for that token and then proceeds to block 907. If that is not the case, then the program proceeds directly to block 908.

Block 907 implements comparator 228 (FIG. 5) and therefore tracks, in the manner discussed above, the score determined for each matched token to identify for each attribute field the two tokens having the highest (largest) scores. The program then proceeds to block 908 where it checks to see it has completed the processing of the ith set of tokens. If it has, then the program proceeds to block 909. If it has not, then it returns to block 904 to process the next token forming the ith set of tokens. At block 909, the program increments the value of i and then proceeds to block 911 if it finds that the value of i is now greater than the value of P (block 910). (if the value of i is not greater than the value of P, then the program proceeds to block 904 to begin the processing of the next set of tokens.) The program at block 911, interprets various combinations of the tokens that it saved in the manner discussed above in connection with process 230 (FIG. 4) and outputs (block 912) the interpretation having the highest total score (i.e., sum of the scores) as the normalized data record. The program (block 913) then exits (block 914) if it finds that it has completed the normalization of all data records. If the program finds that is not the case, then it returns to block 901 to process the next data record.

The foregoing is merely illustrative of the principles of the invention. Those skilled in the an will be able to devise numerous arrangements, which, although not explicitly shown or described herein, nevertheless embody those principles and are within the spirit and scope of the invention. For example, our invention may include spelling and data correction features. In particular, consider a spelling error, such as the misspelled city name of "Martinburg", WV, which is associated with the zip code of 25401. When the latter zip code is encountered during the normalization process, the aforementioned program may be easily arranged to check the name of the associated city. If the name of that city is misspelled, then the program may correct the spelling, i.e., "Martinsburg". Alternatively, if particular data in a record is not correct, then such data may be similarly corrected based on other data contained in the record. For example, if the zip code 25401 had been entered as 2541, then that data may be corrected based on the associated city name, i.e., Martinsburg.

Moreover, although we discussed the aforementioned dictionary in terms of partitioning preformatted data records into ordered n-word tuples, it is clear that other forms of such partitioning may be employed in the partitioning of a data record. The same is true for a free-formatted data record. For example, a data record may be partitioned into non-order preserving tokens, in which a token is formed from non-consecutive data words of a data record. In fact, a token may be any combination or sequence of data words forming a data record. As such, our invention may take advantage of a predefined or pre-existing dictionary, for example, an address dictionary, and, therefore, would not have to generate its own dictionary.

We claim:

1. A system for generating a normalized version of a free-formatted data record, said data record being characterized by a plurality of data words, said system comprising a dictionary comprising sequences of data words associated with respective attribute fields corresponding to respective attribute fields defining a normalized data record and associated with respective weight values, means for partitioning said free-formatted record into a plurality of n-word tuples, where $n \geq 1$, means for associating each of said n-word tuples, that compares with a respective one of said sequences, with the associated one of said attribute fields and a respective score value, said score value being derived as a function of the associated one of said weight values, and for identifying for each of said attribute fields the associated n-word tuples having the largest score values, and means for forming different combinations from individual ones of the identified n-word tuples and output as said normalized data record that one of said combinations formed from those of said identified n-word tuples having score values which produce the largest sum.

2. The system set forth in claim 1 further comprising means for forming said dictionary, said means for forming said dictionary including a plurality of test records each having a predefined format corresponding with respective ones of said attribute fields, means for partitioning each of said test records into respective ones of said sequences of words based on said predefined format, and means for storing each of said sequences of words in said dictionary if it has not yet been stored therein or for incrementing the associated one of said weight values if it has been so stored, and for associating each of said stored sequences of words with a respective one of said attribute fields based on said predefined format.

3. The system set forth in claim 1 wherein said n-word tuples include specific and free-matching n-word tuples.

4. A system for converting a free-formatted data record into a normalized data record, said free-formatted data record being characterized by a plurality of data components, said system comprising a plurality of test records each having a predefined format and each being formed from a plurality of data attributes corresponding to respective attribute fields defining a normalized data record, means for partitioning the data components forming each of said test records into respective specific tokens and free matching tokens, for associating each of said specific and said free matching tokens with respective ones of said data attributes based on said predefined format and for storing each of said specific and free matching tokens and its associated one of said attributes in a dictionary if it has not yet been stored therein or for incrementing an associated counter if it has been so stored, means, responsive to receipt of said free-formatted record from a source of information records, for partitioning the data components forming said record into a number of different sets of specific tokens and a number of different sets of free-matching tokens, for generating a score for each of the tokens of each of said sets that matches a corresponding token stored in said dictionary, in which said score is a function of the contents of the counter associated with the corresponding token, and means for forming the tokens associated with scores into different combinations and for outputting as the normalized version of said record that one of said combinations that is formed from those tokens having scores which produce the largest sum.

5. A method of converting data record having a free-formatted format into a data record having a normalized format, said free-formatted data record being characterized by a plurality of data words, said method comprising the steps of generating a dictionary comprising sequences of data words associated with respective attribute fields and associated with respective weight values, partitioning said free-formatted record into a plurality of ordered n-word tuples, where $n \geq 1$, associating each of said n-word tuples, that compares with a respective one of said sequences, with the associated one of said attribute fields and a respective score value, said score value being derived as a function of the associated one of said weight values, and identifying for each of said attribute fields the associated n-word tuples having the largest score values, and forming different combinations from individual ones of the identified n-word tuples and outputting as said normalized data record that one of said combinations formed from those of said identified n-word tuples having score values which produce the largest sum.

6. A method of translating a data record comprising a plurality of data words and having a free-formatted format into a data record having a normalized format, said method comprising the steps of partitioning said free-formatted data record into a number of different combinations of data words, forming different translated versions of said free-formatted data record from those of said combinations that compare with individual ones of a plurality of sequences of data words forming a dictionary of such sequences, in which each of said sequences is associated with (a) individual ones of a plurality of attribute fields defining the format of a normalized data record and (b) respective score values indicative of the likelihood of such association, and outputting as the normalized format for said free-formatted data record that one of said different translated versions that is formed from those of said combinations that are associated with score values that produce the largest sum of score values.

7. A method of converting a data record formed from a plurality of data words and having a free-formatted format into a data record having a normalized format, said method comprising the steps of storing in a memory a dictionary comprising sequences of data words associated with (a) respective attribute fields corresponding to the fields of a normalized data record and (b) respective weight values, partitioning said free-formatted data record into a plurality of n-word tuples, where $n \geq 1$, associating each of said n-word tuples that compares with at least a respective one said of sequences with the associated one of said attribute fields and a respective score value, said score value being derived as a function of the associated one of said weight values, and identifying for each of said attribute fields the associated n-word tuples having the largest score values, and forming different combinations from individual ones of the identified n-word tuples and outputting as said normalized data record that one of said combinations formed from those of said identified n-word tuples having score values which produce the largest sum.

* * * * *